Figure 1:
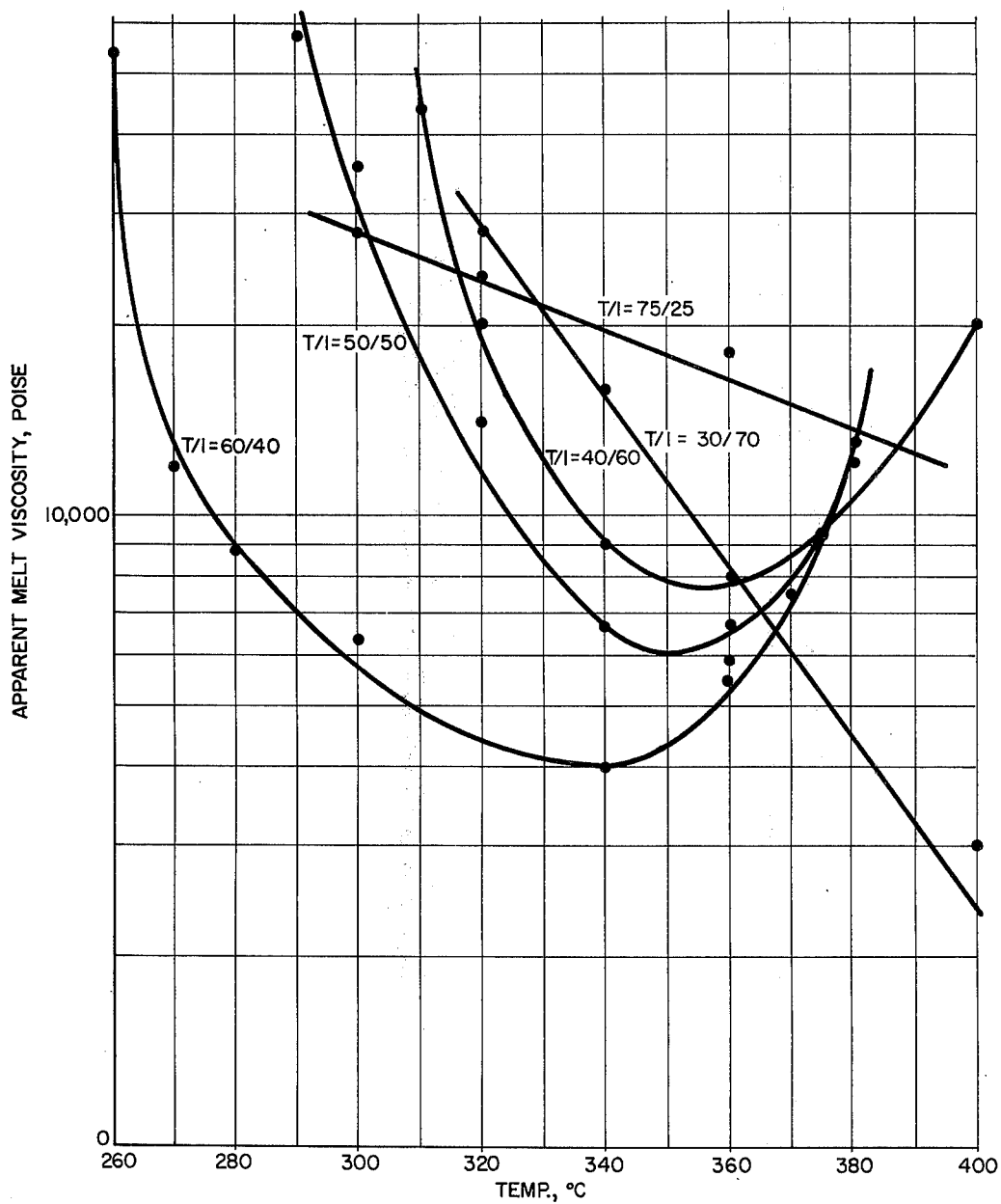

United States Patent [19]

McFarlane et al.

[11] 4,011,199

[45] Mar. 8, 1977

[54] ACIDOLYSIS PROCESS

[75] Inventors: Finley E. McFarlane; Thomas G. Davis, both of Kingsport, Tenn.

[73] Assignee: Eastman Kodak Company, Rochester, N.Y.

[22] Filed: Nov. 28, 1975

[21] Appl. No.: 636,186

[52] U.S. Cl. .................... 260/47 C; 260/75 M
[51] Int. Cl.² ........................... C08G 63/22
[58] Field of Search ............ 260/47 C, 75 R, 75 M

[56] References Cited

UNITED STATES PATENTS

| | | | |
|---|---|---|---|
| 3,238,178 | 3/1966 | Kibler et al. | 260/45.85 |
| 3,345,331 | 10/1967 | Reese | 260/47 C |
| 3,637,595 | 1/1972 | Cottis et al. | 260/47 C |
| 3,756,987 | 9/1973 | Winnick | 260/75 R |
| 3,759,870 | 9/1973 | Economy et al. | 260/47 C |
| 3,778,410 | 12/1973 | Kuhfuss et al. | 260/47 C |
| 3,790,528 | 2/1974 | Tesaki et al. | 260/47 C |

*Primary Examiner*—Lucille M. Phynes
*Attorney, Agent, or Firm*—D. B. Reece, III; Charles R. Martin

[57] ABSTRACT

Disclosed is an acidolysis process for preparation of terephthalate, isophthalate, hydroquinone type polyesters wherein the acidolysis process is conducted within a critical temperature range. Use of the critical temperature range provides a polyester with a low enough apparent melt viscosity to be prepared in commercial, gravity flow reactors.

3 Claims, 1 Drawing Figure

ACIDOLYSIS PROCESS

This invention is a process for preparation of certain kinds of polyesters. The temperature used in the process is maintained within a critical range so that the polyesters can be prepared in commercially available reactors.

In recent decades production of synthetic polymers has increased tremendously in volume. Today a wide variety of synthetic polymers is made in accordance with numerous commercial methods. Polyesters, for example, can be commercially prepared by several processes, including ester interchange, direct esterification and acidolysis.

The melt viscosity of the particular type of polyester being prepared is an important factor in selecting a commercially acceptable manufacturing process. For example, polyesters of aliphatic and cycloaliphatic diols have viscosities that make these polyesters particularly suitable for commercial preparation using an ester interchange process. Polyesters prepared using aromatic diols typically have such high melt viscosities that ester interchange cannot be used. For example, one reason polyesters of terephthalic acid, isophthalic acid and hydroquinone are not prepared in large volumes commercially is because these polyesters become so viscous they will not flow through typical commercial ester interchange reactors under the influence of gravity.

We have invented a process whereby terephthalate, isophthalate, hydroquinone type polyesters can be prepared in commercial gravity flow reactors.

This invention can be described as an acidolysis process for preparation of certain specific terephthalate, isophthalate, hydroquinone type polyesters wherein the temperature used for the acidolysis reaction is maintained within a specific temperature range in order to result in the polyester having a sufficiently low melt viscosity to flow through a typical commercial reactor under the influence of gravity.

The prior art applicants aware of relating to preparation of terephthalic acid, isophthalic acid, and hydroquinone type polyesters is U.S. Pat. Nos. 3,160,602, 3,637,595, and 3,036,992. As will be recognized from a consideration of the prior art, the polyesters prepared by the process of applicants' invention are well known in the art. For example, the terephthalate, isophthalate, hydroquinone type polyesters prepared using the process of applicants' invention are disclosed in U.S. Pat. No. 3,160,602. Also, the acidolysis preparation of polyesters is well known in the art. For example, preparation of hydroquinone type polyesters by acidolysis is disclosed in U.S. Pat. No. 2,595,343.

The process of applicants' invention is thought to be patentable over the prior art because only when the temperature used for the acidolysis reaction is maintained within a critical temperature range and the terephthalate and isophthalate portions of the polyester are within a certain range is the polyester sufficiently non-viscous that the polyester can be prepared in commercial gravity flow type reactors, such as disclosed in U.S. Pat. No. 3,238,178.

The unobviousness of the process for preparing polyesters with a specific terephthalate/isophthalate range using temperatures within a critical range can be fully appreciated by considering the data in the attached FIGURE.

In the FIGURE the horizontal scale represents the temperature of an acidolysis reaction used to prepare various terephthalate, isophthalate, hydroquinone type polyesters having various terephthalate/isophthalate contents. The vertical scale represents the viscous character of the final molecular weight polyester, which is expressed in terms of apparent melt viscosity in poise. Presented in the FIGURE is a family of curves correlating the relationship between the temperature used for the acidolysis reaction and the apparent melt viscosity of the final molecular weight polyester for 5 different polyesters of terephthalic acid, isophthalic acid and methyl hydroquinone. The amount of terephthalic acid compared to isophthalic acid varies widely among these 5 polymers. As will be observed from considering the nomenclature on each curve, the lowest mole percent of terephthalic acid is 30 mole percent and the curve is labeled T/I = 30/70. The highest mole percent of terephthalic acid is 75 mole percent and the curve is labeled T/I = 75/25. The remaining curves present correlations for similar polymers using 40, 50 and 60 mole terephthalic acid and are labeled accordingly.

The data prepare to compare the curves of the FIGURE are obtained by preparing each polyester by acidolysis using a specific temperature and then measuring the apparent melt viscosity of the final molecular weight polyester. The apparent melt viscosity is measured by loading dry polymer, under nitrogen, into a Sieglaff-McKelvey Capillary Rheometer that is controlled at the desired temperature. At the end of 3–5 minutes in the rheometer the polymer is extruded and the appropriate readings taken to calculate the apparent melt viscosity in poise at a given shear rate. The apparent melt viscosity is the ratio of the shear stress at the wall, $\tau_\omega$, to the apparent Newtonian shear rate, $\gamma_N$, or $\tau_\omega/\gamma_N$ where $$\tau_\omega = \frac{\Delta P R_c}{2 L_c}$$

$$\gamma_N = \frac{4Q}{\pi R_c^3}$$

$\Delta P$ = Pressure drop in dynes/cm$^2$
$Q$ = Discharge rate in Cm$^3$/sec.
$R_c$ = Radius of capillary
$L_c$ = Length of capillary Considering now a specific example of the manner in which the data used to prepare the curves in the FIGURE are developed, a polyester containing 50 mole percent terephthalate and 50 mole percent isophthalate is prepared by conducting an acidolysis reaction between terephthalic acid, isophthalic acid and methyl hydroquinone diacetate seven different times at temperatures of 290° C., 300° C., 320° C., 340° C., 360° C., 370° C., and 380° C. Each of the seven polyesters prepared at different temperatures is then tested for apparent melt viscosity. More specifically, the polyester of 50 mole percent terephthalate and 50 mole percent isophthalate is prepared by acidolysis at 340° C. in accordance with the following procedure.

The following components were carefully weighed into a one-neck, 500-ml., Pyrex round-bottom flask:
  104.0 g. (0.50 moles) methyl hydroquinone diacetate
  41.5 g. (0.25 moles) terephthalic acid
  41.5 g. (0.25 moles) isophthalic acid The flask was fitted with a stirrer and condensate take-off and immersed into a Wood's metal bath at 150° C. The temperature was raised over a period of approximately 30 minutes. When the temperature reached approximately 275° C., the reaction started and acetic acid was taken off. The reaction was continued for approximately 1 hour at 300° C., then the temperature was raised to 340° C. Vacuum was applied and held at approximately 0.10 mm. for approximately 1 hour. The resultant polyester had an inherent viscosity of greater than 1.20.

As will be observed from a consideration of the curves of the FIGURE, the correlation of the temperature used to conduct the acidolysis reaction and apparent melt viscosity for the 75 mole percent terephthalic acid polyester and the 30 mole percent terephthalic acid polyester is linear while the correlation for values of the 40, 50 and 60 mole percent terephthalic acid polyesters is not only nonlinear, but falls to a minimum value.

As is well known in the art, the maximum melt viscosity that can be tolerated in the commercial preparation of polyesters in commercial gravity flow reactors is about 10,000 poise. If the apparent melt viscosity is above about 10,000 poise, the polyester is too viscous to flow through the reactor under the influence of gravity. As will be observed from the curves of the FIGURE, the melt viscosity is below 10,000 poise for the polyesters containing 40, 50 and 60 percent terephthalic acid only when the temperature used for the acidolysis reaction is within the range of about 275° C. to about 375° C. When the temperature used for acidolysis is below about 275° C., or above about 375° C., the polyester exhibits a melt viscosity above 10,000 poise and consequently cannot be prepared in typical commercial gravity flow reactors.

The process of applicants' invention can be broadly described as a process for preparation of a polyester having an inherent viscosity of at least 0.5 comprising contacting within a temperature range of 275° C. to 375° C., under polyester forming conditions,
   A. a dicarboxylic acid component comprised of
      1. from 60 to 35 mole percent terephthalic acid,
      2. from 40 to 65 mole percent isophthalic acid, and
   B. a diol component corresponding to the structure

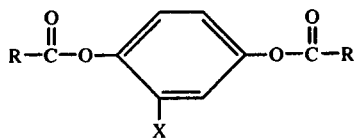

wherein
   R is a monovalent alkyl, aromatic or alicyclic radical, and
   X is —Cl, —Br or a monovalent alkyl radical having 1 to 4 carbon atoms.

Both the acid and diol components used in the process of applicants' invention are well known in the art.

Terephthalic acid and isophthalic acid are well known and used commercially in large volume. While broadly the terephthalic acid can be 60 to 35 mole percent and the isophthalic acid can be 40 to 65 mole percent, in a preferred embodiment the terephthalic acid can be 60 to 40 mole percent and the isophthalic acid can be 40 to 60 mole percent.

The substituted hydroquinones useful in this invention are well known in the art and are described in U.S. Pat. No. 3,160,602.

The substituent X on the ring can be a monovalent alkyl radical having 1 to 4 carbon atoms, such as methyl, ethyl, propyl, isopropyl, butyl, isobutyl, or tertiary butyl. In addition the substituent X on the ring can be —Cl or —Br. Preferably the substituent X is —CH₃.

The acidification of hydroquinone to form the diol component useful in this invention is well known in the art and is disclosed in U.S. Pat. No. 2,595,343. The monovalent radical R, which is a portion of the acid used to acidify the hydroquinone, can be a monovalent aliphatic, alicyclic or aromatic radical. In one aspect of the invention this radical typically has a molecular weight of less than 300. In another aspect of this invention this radical contains up to 40 carbon atoms. Examples of aliphatic acids that can be used are formic, acetic, propionic, butyric, pentanoic, hexanoic, heptanoic, and the like. The aliphatic acid can be either straight or branched chain. Examples of cycloaliphatic acids include cyclohexane carboxylic acid, and cyclohexane dicarboxylic acids containing various substituents on the ring, such as methyl, ethyl, propyl, and the like. Examples of aromatic acids are benzoic acid, diphenyl carboxylic acid, and naphthalene carboxylic acid. These dicarboxylic acids can have various substituents on the ring such as methyl, ethyl, propyl, and the like. In a preferred embodiment the carboxylic acid is an alkyl carboxylic acid having 2 to 5 carbon atoms. In this preferred embodiment the radical R would be a monovalent alkyl radical having 1 to 4 carbon atoms. In a particularly preferred embodiment R is —CH₃, and the acid is acetic acid.

In this invention the acidified hydroquinone has been described as a "diol component". It will be understood that although the compound is actually a diacetoxy compound, the compound can be thought of as a functional equivalent of a diol because the compound contributes the same divalent radical as would be contributed by removal of the terminal hydrogen atoms from the corresponding substituted hydroquinone.

The acidolysis process of applicants' invention can be practiced by contacting the dicarboxylic acid components and the diol component under suitable thermodynamic conditions.

As reported earlier, the process of applicants' invention involves contacting the components within a temperature range of 275° C. to 375° C., preferably 330° C. to 360° C. By use of the term "contacted within a temperature range of 275° C. to 375° C.", and words of similar import, we mean that the temperature is initially raised to a level to form the components into dimers, trimers and the like, which have a sufficiently high molecular weight to allow the temperature to be raised to the temperature to be used for polymerization without volatilization of the components, and then the temperature is increased to the temperature to be used for preparation of the polymer. As would be obvious to a man skilled in the art, if the components were to be initially heated to a temperature around the upper limit of the temperature range of applicants' invention, for example, 370° C., the components would volatilize and no polymer would be formed.

The pressure used to practice the process of this invention can vary widely. Typically the pressure should be lower than atmospheric to assist in removal of the acid produced during acidolysis. Preferably the pressure should be below 10 mm. of Hg. and more preferably about 0.10 mm. Low pressures tend to reduce the time required for preparation of the polyester.

The time used to practice the process of this invention varies widely and depends largely on the temperature and pressure selected. Higher temperatures tend to cause the inherent viscosity of at least 0.5 to be achieved more rapidly than lower temperatures because of the speed of the reaction. Also, low pressures facilitate the removal of the acidolysis product and consequently reduce the amount of time used for the process. When the preferred temperature of 330° C. to 360° C. is used in conjunction with a low pressure of 0.10 mm. Hg., the inherent viscosity of at least 0.5 is achieved more rapidly because not only is the melt viscosity at a minimum, allowing faster movement of the polyester through a commercial reactor, but also this high temperature and low pressure favor a rapid chemical reaction.

The dicarboxylic acid components and diol component can be caused to be contacted by mechanical means well known in the art. In one embodiment, the components can be stirred with a typical mechanical type stirrer of the kind well known in the art. A more commercially acceptable method to accomplish contact between the components is to utilize a gravity flow commercial reactor such as disclosed in U.S. Pat. No. 3,238,178.

The polyesters of this invention have an I.V. of at least 0.5, preferably at least 0.7, measured at 25° C. using 0.50 grams of polymer per 100 ml. of a solvent composed of 60 volumes of phenol and 40 volumes of tetrachloroethane.

The invention has been described in detail with particular reference to certain preferred embodiments thereof, but it will be understood that variations and modifications can be effected within the spirit and scope of the invention. For example, under certain conditions it might be possible to vary the amounts of terephthalate and isophthalate content of the polyesters.

We claim:

1. A process for preparation of a polyester having an inherent viscosity of at least 0.5 comprising contacting within a temperature range of 275° C. to 375° C., under polyester forming conditions,
   A. a dicarboxylic acid component comprised of
      1. from 60 to 35 mole percent terephthalic acid,
      2. from 40 to 65 mole percent isophthalic acid, and
   B. a diol component corresponding to the structure

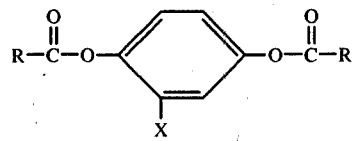

wherein
   R is a monovalent alkyl, aromatic or alicyclic radical, and
   X is —Cl, —Br or a monovalent alkyl radical having 1 to 4 carbon atoms.

2. The process of claim 1 wherein
   R is a monovalent alkyl radical having 1 to 4 carbon atoms, and
   X is a monovalent alkyl radical having 1 to 4 carbon atoms.

3. A process for preparation of a polyester having an inherent viscosity of at least 0.7 comprising contacting within a temperature range of 330° C. to 360° C. under polyester forming conditions
   A. a dicarboxylic acid component comprised of
      1. from 60 to 40 mole percent terephthalic acid,
      2. from 40 to 60 mole percent isophthalic acid, and
   B.

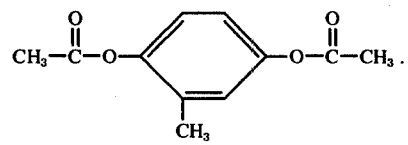

* * * * *